Patented Mar. 7, 1933

1,900,648

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

CATALYTIC SIDE CHAIN OXIDATION OF AROMATIC COMPOUNDS

No Drawing. Original application filed June 3, 1927, Serial No. 196,393. Divided and this application filed March 28, 1928. Serial No. 265,521.

This invention relates to the catalytic oxidation of side chains of aromatic compounds to the corresponding aldehydes and acids, and more particularly relates to vapor phase catalytic oxidations.

It has been proposed in the past to oxidize the side chains of various aromatic compounds, such as, for example, toluols and substituted toluols to benzaldehydes and benzoic acids, xylenes to toluic acids and aldehydes, mesitylene, pseudocumene, and the like to the corresponding acids and aldehydes. Vapor phase oxidation of these products has almost uniformly been unsuccessful for the reaction is very sensitive and tends to over oxidation resulting in large losses by total combustion and in some cases of the production of undesired by-products. The reaction is strongly exothermic and when it proceeds too far the exotherm is greatly increased so that the reaction in the presence of the contact masses used hitherto may be considered to have been in unstable equilibrium and presents a very serious control problem.

According to the present invention, catalysts or contact masses containing catalytic elements, whether diluted with carrier particles or undiluted, are associated with stabilizers, which prevent to a large extent undesired side reactions and permit a catalytic control which allows excellent yields and high outputs. The stabilizers used in the present invention are not to be considered as themselves catalysts. In fact, they are characterized by the fact that they contain basic radicals which in their basicity, valance or stability of their oxides at high temperatures toward oxidizing agents are radically different from the characteristics of the catalytic elements. The stabilizing elements which are usually present in the form of salts or other active compounds are the alkali metals, the alkaline earth metals, and some earth metals which form oxides which are not reducible by hydrogen, the principal ones being beryllium and magnesium, all of which elements will be referred to in the present invention as stabilizer forming metals. The salts or other active compounds of these stabilizing elements produce a very desirable stabilizing effect, and practically any of the salts can be used which do not contain acid radicals having a deleterious effect upon the particular reaction in which the catalyst is to be utilized. Thus, for example, the acid or neutral sulfates, phosphates, halides, chlorates, nitrates, cyanides, both simple and complex, arsenates, antimonates, bismuthates, borates, carbonates and the like give excellent results.

The above compounds are all active chemically, being simple or complex salts which are ionized. All of these compounds contain the alkali forming metals in an active form, as opposed to complex silicates of the metals such as certain naturally occurring rocks which, as are well-known, are inert or practically inert chemically and which are frequently used as carriers for catalysts. It should be understood that such components are not included under the term "active compounds".

The stabilizers can be added to the catalysts or contact masses containing the catalysts in a chemically preformed state, or they may be produced by chemical reaction in the presence of the other components of the contact mass. Thus, for example, a stabilized vanadium pentoxide catalyst may be produced by adding potassium bisulfate in suitable amounts to vanadium oxide in any suitable manner, or a potassium vanadate catalyst can be caused to react with vapors containing sulfur trioxide or sulfur dioxide and air, or with dilute sulfuric acid, producing the vanadium oxide and potassium bisulfate in situ. In both cases, the potassium bisulfate will act as a stabilizer, but the action will not be the same as the physical arrangement of the molecules, and perhaps to a certain extent the chemical combination is different with different methods of producing a contact mass having the same empirical chemical composition, and the catalytic activity depends not only on the empirical chemical composition, but also on the physical arrangement and on the method of formation of the contact mass. Stabilizers can, of course, also be generated in situ by reaction of various acid bodies with stabilizer forming metal compounds of components other than the catalyst component of the contact masses.

The stabilizers can be introduced or formed in situ in any desired manner, and in the case of diluted catalysts may be incorporated into the readily formed diluted catalyst, or into a diluent or any of the catalysts or catalyst forming components before actual formation of the contact mass.

Another method of producing stabilized catalysts consists in incorporating catalytic components in carriers which themselves contain stabilizers or which contain compounds capable of forming stabilizers by subsequent treatment.

In the catalytic oxidation of side chains of aromatic compounds free alkali is frequently undesirable especially when the oxidation is carried to the acid stage. Any free alkali present in the contact masses can be readily neutralized by treatment with acid gases as described in my prior Patent No. 1,678,627, dated July 24, 1928. This treatment transforms any alkali present into alkali forming metal salts which act as non-alkaline stabilizers.

Any other suitable method of incorporating compounds of the stabilizer forming metals with catalysts or in contact masses may be used and are included in the present invention.

Diluting catalysts with finely divided or highly porous diluents is frequently desirable, and such diluted catalysts may be associated with stabilizers or stabilizers may be formed therein. It is not definitely known whether diluents of desirable physical structure have any influence on the effect of the stabilizers or not, since any effect on the stabilizer is probably masked by corresponding effects on the catalyst. Thus, diluents of high porosity or capillarity greatly increase the effectiveness of almost any catalyst and naturally, of course, increase the efficiency of any corresponding stabilized catalyst, but whether this added effectiveness is to be attributed partly to effects on the stabilizer or wholly to effects on the catalyst, is difficult or impossible to prove and the present invention is not limited to any theories of action of diluents.

The amount and nature of the stabilizers to be added depends, of course, on the reaction and on the contact mass chosen and especially depends on whether it is desired to produce aldehydes or acids. In general, a larger amount of stabilizer favors the production of aldehydes.

It is not definitely known just how the stabilizer acts. I am of the opinion, however, that in many, if not most, catalytic oxidations of organic compounds the most important effect is to reduce its activity in total combustion. In the case of some vanadium oxide catalysts, the color shows that when sufficient stabilizers of suitable type are added, all of the vanadium is not continuously regenerated to vanadium pentoxide, as the catalyst shows various colors of blue, green and gray and does not remain yellow as is the case with an unstabilized vanadium oxide catalyst. Whether, however, this is the only effect of a stabilizer and whether this effect is true with all catalytic elements, is not difinitely determined and the present invention is not limited to any theory of action and it may well be that the stabilizer has other actions. It should be noted, however, that while in many cases the stabilizer appears to reduce the oxidation catalytic activity of the catalyst, it does not reduce the efficiency of the catalyst, but on the contrary, greatly increases the overall efficiency, that is to say, the output of the desired intermediate oxidation products per unit of catalyst per unit of time, and it may be that certain activities of the catalyst are actually enhanced and in fact this appears likely, because as has been stated above, all stabilizing elements are not equally effective in their reaction and it may well be that certain stabilizers actually enhance the catalytic power of the catalyst. While it is an advantage of the present invention that in many cases increased outputs are obtained with stabilized catalysts, the invention is in no sense limited to catalysts or processes in which the actual output is increased. In some cases, where extreme purity is desired, this can be obtained with a stabilized catalyst by reducing the loading and the advantages of the present invention can be enjoyed even though the properties of the catalysts of the present invention are not utilized all in one direction, namely, increasing the output. As in all catalytic reactions there is a certain compromise between purity of product and output, and the best compromise to be chosen in every case will be determined by the skilled catalytic chemist.

Stabilized catalysts when used in oxidation reactions according to the present invention bring about remarkably improved results, and in many cases a stabilizer alone is sufficient. I have found, however, that the addition of other chemical compounds possessing catalytic activity, but not being specific catalysts for the particular reaction, appears to enhance the effect of the stabilizer and to tune it for more perfect results for the individual reactions. These compounds will be referred to as stabilizer promoters without thereby limiting the invention to any particular theory of action as it may be that the stabilizer promoters do not act directly on the stabilizer itself. Among the stabilizer promoters are the usual catalytic compounds containing the usual catalytic elements and particularly heavy metals and some amphoteric metals, such as aluminum, zinc, lead and the like. In general, of course, any catalytic element which is not a specific catalyst for the reaction in question may, when combined with a stabilized catalyst for that reaction, act as a stabilizer promoter. Among the most effective stabilizer promoters are, however, some of the catalytic elements which are by themselves relatively mild catalysts and the effect of the stabilizer promoter is not a pure additive one based on the catalytic power of the elements present in the stabilizer promoter. On the contrary, the results tend to indicate that there is a definite cooperation between the stabilizer promoter and the stabilizer catalysts and in some cases, the addition of stabilizer promoters produces results greatly in excess of those which would be predicted from the known catalytic power of the promoter elements themselves.

Stabilizer promoters may be added in a chemically preformed state or formed in situ as has been described in the case of stabilizers, and the forms of introduction may take place in any suitable manner, as will be apparent to the skilled chemist. It is, however, by no means necessary that the stabilizer promoters should be present as separate chemical compounds and on the contrary, many very effective catalysts may be produced by the addition of compounds of the stabilizing forming metals with various stabilizer promoter elements. Thus, for example, the various alkali metal metallates form excellent composite stabilizers and stabilizer promoters. It is possible, of course, that during reaction these compounds break up to a certain extent, and perhaps even in such cases the stabilizer becomes completely dissociated from the stabilizer promoter. It is impossible, however, to determine just what takes place within the catalyst during catalysis, and I do not wish to limit my invention to any theory.

In addition to stabilizers and stabilizer promoters, which are present or are introduced as individual chemical compounds or combined chemically with each other, the stabilizer promoters may be present in chemical combination with various diluents. Thus, for example, many heavy or other metal silicates form at the same time excellent diluents and stabilizer promoters. Notable examples of these compounds are various zeolites in which heavy metal or other elements are present in exchangeable or non-exchangeable form. These zeolites, and, in fact, base exchanging bodies generally, whether zeolites or non-silicious base exchange bodies, possess for the most part a microporous structure which is excellently suited as a catalyst diluent or as a framework in or on which catalytically active elements may be hung. Such base exchange bodies permit in some cases also a chemical combination between the stabilizer, stabilizer promoter and the catalyst itself. Thus, for example, a zeolite or other base exchange body may contain a catalytically active element and also a heavy metal or an amphoteric metal oxide associated with stabilizers. Such catalysts are among the most effective for the oxidation of organic compounds and are of course included as one of the important classes of the present invention. The formation of these zeolites or other base exchange bodies, whether containing catalytically active elements in chemical combination or not, is described in the co-pending applications of myself and Johann A. Bertsch, Serial No. 100.116, filed April 6, 1926, and Serial No. 95,771, filed March 18, 1926, and prior Patent No. 1,701,075, dated February 5, 1929, and in my prior Patents No. 1,728,732, dated September 17, 1929, and No. 1,694,620, dated December 11, 1928, and any of the methods of formation therein set forth may be used to produce base exchange bodies containing stabilizers or stabilizers and stabilizer promoters for use in the side chain oxidation of aromatic compounds according to the present invention.

The invention is not limited, of course, to the use of any particular diluent, but diluents of high porosity and high capillarity greatly enhance the effectiveness of the contact mass used. The action of the diluents, particularly the porous diluents appears to be primarily due to their physical characteristics. Catalytically active components which are not catalysts for the particular reaction are classified under stabilizer promoters, although, of course, it is difficult in some extreme cases to draw a line between diluents and stabilizer promoters in the case of certain compounds which appear to have weak catalytic activity which may be due to their physical or to their chemical characteristics. In general, however, where components which do not possess fairly high catalytic activity, as a result of their chemical structure, they are to be classed as diluents rather than stabilizer promoters.

*Example 1*

200 parts by volume of pea-size pumice fragments are impregnated with a concentrated solution containing 25 parts by weight of acid potassium phosphovanadate. The contact mass is then dried at temperatures below red heat and calcined and is a good catalyst for the oxidation of toluol, chlorotoluols, nitrotoluols, chlornitrotoluols and bromnitrotoluols to the corresponding aromatic aldehydes and acids. Preferably, vapors of the compounds should be mixed with a great excess of air and should be passed over the contact mass at 330–420° C.

*Example 2*

60 parts of kieselguhr are uniformly impregnated with a solution of 10 parts of $V_2O_5$ and 15 parts of KOH in 60–70 parts of water. The impregnated material therefore contains potassium vanadate and excess KOH, and is formed into granules and treated with a mixture of air and chlorine until completely saturated with the latter. Thereupon, the temperature is gradually raised, some chlorine being still passed over if necessary, mixed also with air and steam. The contact mass thus obtained catalyzes the oxidation of toluols and substituted toluols, xylienes, pseudocumenes, mesitylene, paracymene and other substitution products to the corresponding aldehydes and acids under the conditions described above.

*Example 3*

30 parts of kieselguhr are mixed with 40 parts of colloidal silicic acid and then impregnated with 20 parts of potassium molybdate, 3 parts of sodium tungstate, 2 parts of lithium tantalate and 30 parts of 33° Bé. potassium waterglass. The moist mass is pressed into granules, calcined and then given a subsequent short treatment with gases containing $SO_3$ and chlorine. This contact mass is suited for the catalytic oxidation of chlortoluol to chlorbenzaldehyde. Instead of using gases containing $SO_3$ and chlorine, gases containing oxides of nitrogen may be used until no further absorption takes place. A still further tuning of the catalyst may also be effected by the addition of 3:4 parts of potassium phosphate.

*Example 4*

12.2 parts of $Ta_2O_5$ in the form of potassium tantalate, 10 parts of $MoO_3$ in the form of potassium molybdate, 11.8 parts of $WO_3$ in the form of potassium tungstate are dissolved in 500 parts of water and sufficient 10% sulfuric acid is added with vigorous agitation to precipitate the acids in a finely divided form. 28 parts of $UO_3$ in the form of a 5% aqueous solution of uranyl nitrate are then added and uranium hydroxide is precipitated with potassium hydroxide. A solution of 33° Bé. potassium waterglass containing 70 to 75 parts of $SiO_2$ and diluted with 200 parts of water is then added to suspension with vigorous agitation and heated to about 75° C., the whole solidifying to a gel which on further stirring breaks up into fragments. These are then sucked as usual, thoroughly washed in water in a number of portions of about 100 parts each, or the pressed gel can be dried under 100° C. and water permitted to trickle over it until it breaks into fragments.

The product is a zeolite-like body containing in non-exchangeable form tantalum, molybdenum, tungsten and uranium and can be used as a catalyst for the oxidation of toluol and its derivatives to the corresponding aldehydes.

*Example 5*

20 parts of $V_2O_5$ are suspended in 500 parts of water and acidified with concentrated sulfuric acid and reduced at an elevated temperature with gases containing $SO_2$ to form the blue vanadyl sulfate. The solution is divided into two equal parts, half being treated with 5N potassium hydroxide solution at 50–60° C. until a clear, coffee-brown solution of the potassium vanadite is produced, which is then diluted with 60 parts of celite or a mixture of 40 parts of celite and 40 parts of finely comminuted quartz. Other diluents such as silicates of the heavy metals or silicates which contain barium, calcium or magnesium of rocks, tuff, lava, trass, etc. may be used. To this suspension the other half of the vanadyl sulfate solution is added, care being taken that after the addition is complete, the mixture still reacts alkaline or neutral to phenolphthalein. After freeing from the mother liquor the reaction product is a diluted potassium vanadyl base exchange body which can be used for the oxidation of toluol to benzaldehyde. If the alkali of the base exchange body is neutralized with dilute acids such as for example, 3 to 5% sulfuric, phosphoric or nitric acids, the neutral or acid alkali metal salt is produced and the resulting contact mass can be used for the catalytic oxidation of toluol to benzoic acid.

*Example 6*

A blue vanadyl sulfate solution containing 16.6 parts of $V_2O_4$ is reduced electrolytically between platinum electrodes until the blue color of the solution is turned to green, 24 parts of $SiO_2$ in the form of a 33° Bé. waterglass solution are diluted with 10 volumes of water and the vanadium containing solution is stirred in with vigorous agitation until the alkalinity is between methyl orange and phenolphthalein red. A light green gelatinous mass precipitates out, which is sucked and dried and constitutes a zeolite-like body containing trivalent vanadium oxide in non-exchangeable form, and in which the stabilizing alkali is combined in a complex form. This contact mass can be used for the oxidation of toluol and air to benzaldehyde. Considerable secondary chemical changes take place in the catalyst during catalysis, as the color undergoes considerable change.

This application is a division of my copending application, Serial No. 196,393, filed June 3, 1927, which matured into Patent No. 1,709,853, dated April 23, 1929.

What is claimed as new:

1. A method of oxidizing the side chains of side chain aromatic compounds, which comprises causing the compounds to react with an oxidizing gas in the presence of an oxidation catalyst having associated therewith at least one active compound of a metal included within the group of alkali metals, alkaline earth metals.

2. A method of oxidizing the side chains of side chain aromatic compounds, which comprises causing the vapors of the compounds admixed with an oxidizing gas to react in the presence of an oxidation contact mass having associated therewith at least one active compound of a metal included within the group of alkali metals, alkaline earth metals.

3. A method of oxidizing the side chains of side chain aromatic compounds, which comprises causing the vapors of the compounds admixed with an oxidizing gas to react in the presence of an oxidation contact mass having associated therewith at least one active compound of a metal included within the group of alkali metals, alkaline earth metals and at least one catalyst included in the group consisting of hydrogenation catalysts, dehydrogenation catalysts, reduction catalysts, oxidation catalysts which, when used alone, are not specific catalysts for the oxidation of side chain aromatic compounds, the catalytic activity of the specific catalysts for the side chain oxidation of aromatic compounds contained in the oxidation contact mass being greater than that of the non-specific catalysts included in the above group.

4. A method of oxidizing the side chains of side chain aromatic compounds, which comprises causing the vapors of the compounds admixed with an oxidizing gas to react in the presence of an oxidation contact mass having associated therewith at least one active compound of a metal included within the group of alkali metals, alkaline earth metals and also containing an oxygen compound of vanadium as at least one of its catalytically active components.

5. A method of oxidizing the side chains of side chain aromatic compounds, which comprises causing the vapors of the compounds admixed with an oxidizing gas to react in the presence of an oxidation contact mass having associated therewith at least one non-alkaline active compound of a metal included within the group of alkali metals, alkaline earth metals.

6. A method of oxidizing the side chains of benzene homologue compounds, which comprises causing them to react with oxidizing gas in the presence of an oxidation catalyst having associated therewith at least one active compound of a metal included within the group of alkali metals, alkaline earth metals.

7. A method of oxidizing the side chains of benzene homologue compounds, which comprises causing the vapors of the compound to react with an oxidizing gas in the presence of an oxidation contact mass having associated therewith at least one active compound of a metal included within the group of alkali metals, alkaline earth metals.

8. A method of oxidizing the side chains of benzene homologue compounds, which comprises causing the vapors of the compound to react with an oxidizing gas in the presence of an oxidation contact mass having associated therewith at least one active compound of a metal included within the group of alkali metals, alkaline earth metals and at least one catalyst included in the group consisting of hydrogenation catalysts, dehydrogenation catalysts, reduction catalysts, oxidation catalysts which, when used alone, are not specific catalysts for the oxidation of side chain aromatic compounds, the catalytic activity of the specific catalysts for the side chain oxidation of aromatic compounds contained in the oxidation contact mass being greater than that of the non-specific catalysts included in the above group.

9. A method of oxidizing the side chains of benzene homologue compounds, which comprises causing the vapors of the compound to react with an oxidizing gas in the presence of an oxidation contact mass having associated therewith at least one active compound of a metal included within the group of alkali metals, alkaline earth metals and also containing an oxygen compound of vanadium as at least one of its catalytically active components.

10. A method of oxidizing the methyl group of benzene homologue compounds containing at least one methyl group, which comprises causing the compound to react with an oxidizing gas in the presence of an oxidation catalyst having associated therewith at least one active compound of a metal included within the group of alkali metals, alkaline earth metals.

11. A method of oxidizing the methyl groups of benzene compounds containing at least one methyl group, which comprises causing the vapors of the compounds to react with an oxidizing gas in the presence of an oxidation contact mass having associated therewith at least one active compound of a metal included within the group of alkali metals, alkaline earth metals.

12. A method of oxidizing the methyl groups of benzene compounds containing at least one methyl group, which comprises causing the vapors of the compounds to react with an oxidizing gas in the presence of an oxidation contact mass having associated therewith at least one active compound of a metal included within the group of alkali metals, alkaline earth metals and at least one catalyst included in the group consisting of hydrogenation catalysts, dehydrogenation catalysts, reduction catalysts, oxidation catalysts which, when used alone, are not specific catalysts for the oxidation of side chain aromatic compounds, the catalytic activity of the specific catalysts for the side chain oxidation of aromatic compounds contained in the oxidation contact mass being greater than that of the non-specific catalysts included in the above group.

13. A method of oxidizing the methyl groups of benzene compounds containing at least one methyl group, which comprises causing the vapors of the compound to react with an oxidizing gas in the presence of an oxidation contact mass having associated therewith at least one active compound of a metal included within the group of alkali metals, alkaline earth metals and also containing an oxygen compound of vanadium as at least one of its catalytically active components.

14. A method of oxidizing side chains of toluene compounds which comprises causing vapors of the compounds admixed with an oxidizing gas to react in the presence of an oxidation contact mass having associated therewith at least one active component of a metal included within the group of alkali metals, alkaline earth metals.

15. A method of oxidizing side chains of toluene compounds which comprises causing vapors of the compounds admixed with an oxidizing gas to react in the presence of an oxidation contact mass having associated therewith at least one active compound of a metal included within the group of alkali metals, alkaline earth metals and at least one catalyst included in the group consisting of hydrogenation catalysts, dehydrogenation catalysts, reduction catalysts, oxidation catalysts which, when used alone, are not specific catalysts for the oxidation of side chain aromatic compounds, the catalytic activity of the specific catalysts for the side chain oxidation of aromatic compounds contained in the oxidation contact mass being greater than that of the non-specific catalysts included in the above group.

16. A method of oxidizing side chains of toluene compounds which comprises causing vapors of the compounds admixed with an oxidizing gas to react in the presence of an oxidation contact mass having associated therewith at least one active compound of a metal included within the group of alkali metals, alkaline earth metals and also containing an oxygen compound of vanadium as one of its catalytically active components.

17. A method of oxidizing a side chain of toluene which comprises causing it to react with an oxidizing gas in the presence of an oxidation catalyst containing at least one active compound of a metal included with the group of alkali metals, alkaline earth metals.

18. A method of oxidizing a side chain of toluene which comprises causing the vapors of toluene admixed with an oxidizing gas to react in the presence of an oxidation contact mass having associated therewith at least one active compound of a metal included with the group of alkali metals, alkaline earth metals.

19. A method of oxidizing a side chain of toluene which comprises causing the vapors of toluene admixed with an oxidizing gas to react in the presence of an oxidation contact mass having associated therewith at least one active compound of a metal included within the group of alkali metals, alkaline earth metals and at least one catalyst included in the group consisting of hydrogenation catalysts, dehydrogenation catalysts, reduction catalysts, oxidation catalysts which, when used alone, are not specific catalysts for the oxidation of side chain aromatic compounds, the catalytic activity of the specific catalysts for the side chain oxidation of aromatic compounds contained in the oxidation contact mass being greater than that of the non-specific catalysts included in the above group.

20. A method of oxidizing a side chain of toluene which comprises causing the vapors of toluene admixed with an oxidizing gas to react in the presence of an oxidation contact mass having associated therewith at least one active compound of a metal included with the group of alkali metals, alkaline earth metals, the contact mass also containing an oxygen compound of vanadium as at least one of its catalytically active components.

Signed at Pittsburgh, Pennsylvania, this 23rd day of March, 1928.

ALPHONS O. JAEGER.